US012592770B2

(12) United States Patent      (10) Patent No.:   US 12,592,770 B2
Brenne et al.      (45) Date of Patent:    Mar. 31, 2026

(54) DISTRIBUTED FIBER OPTIC SENSING ON OPTICAL FIBERS CARRYING TRAFFIC

(71) Applicant: Alcatel Submarine Networks, Nozay (FR)

(72) Inventors: Jan Kristoffer Brenne, Trondheim (NO); Erlend Ronnekleiv, Trondheim (NO)

(73) Assignee: Alcatel Submarine Networks, Nozay (FR)

( * ) Notice: Subject to any disclaimer, the term of this patent is extended or adjusted under 35 U.S.C. 154(b) by 220 days.

(21) Appl. No.: 18/326,140

(22) Filed: May 31, 2023

(65) Prior Publication Data

US 2023/0388012 A1     Nov. 30, 2023

(30) Foreign Application Priority Data

May 31, 2022    (EP) ..................................... 22305796

(51) Int. Cl.
    *H04B 10/07*        (2013.01)
    *G01M 11/00*       (2006.01)
           (Continued)

(52) U.S. Cl.
    CPC ........... *H04B 10/071* (2013.01); *G01M 11/31* (2013.01); *G01V 1/226* (2013.01); *H04B 10/07* (2013.01); *H04B 10/40* (2013.01); *H04J 14/02* (2013.01)

(58) Field of Classification Search
    CPC ...... H04B 10/071; H04B 10/07; H04B 10/40; G01M 11/31; G01M 5/0091; G01V 1/226;
          (Continued)

(56) References Cited

U.S. PATENT DOCUMENTS 6,973,268 B1 * 12/2005 Thompson ......... H04B 10/2589
                               359/341.1
10,211,920 B1 * 2/2019 Khaleghi ........... H04Q 11/0066
                 (Continued)

FOREIGN PATENT DOCUMENTS

EP        3855138 A1    7/2021
WO    2020/202654 A1   10/2020

OTHER PUBLICATIONS

Wellbrock et al., "First Field Trial of Sensing Vehicle Speed, Density, and Road Conditions by Using Fiber Carrying High Speed Data", Optical Fiber Communications Conference and Exhibition (OFC), Mar. 3-7, 2019, 3 pages.

(Continued)

*Primary Examiner* — Dibson J Sanchez
(74) *Attorney, Agent, or Firm* — Tong, Rea, Bentley & Kim, LLC

(57) ABSTRACT

Various example embodiments for supporting distributed fiber optic sensing are presented. Various example embodiments for supporting distributed fiber optic sensing may be configured to support distributed fiber optic sensing via fiber optic cables. Various example embodiments for supporting distributed fiber optic sensing via a fiber optic cable may be configured to support distributed fiber optic sensing based on interrogation of an optical fiber of the fiber optic cable that is also configured to carry communications. Various example embodiments for supporting distributed fiber optic sensing of a fiber optic cable may be configured to support distributed fiber optic sensing of a fiber optic cable based on interrogation of an optical fiber of the fiber optic cable that is also configured to carry optical data communication channels using an optical interrogation channel where the optical data communication channels and the optical interrogation channel are spectrally separated.

16 Claims, 7 Drawing Sheets

(51) Int. Cl.

| | |
|---|---|
| *G01V 1/22* | (2006.01) |
| *H04B 10/071* | (2013.01) |
| *H04B 10/40* | (2013.01) |
| *H04J 14/02* | (2006.01) |

(58) Field of Classification Search
CPC .... G01D 5/35358; G01K 11/32; G01L 1/242; G01H 9/004; H04J 14/02
USPC .......................... 398/9–38, 43–103, 135–139
See application file for complete search history.

(56) References Cited

U.S. PATENT DOCUMENTS

| | | | |
|---|---|---|---|
| 10,432,302 B1 * | 10/2019 | Delgado ................. | H04J 14/02 |
| 11,271,642 B1 * | 3/2022 | Ponchon ............ | H04Q 11/0005 |
| 2003/0231888 A1 * | 12/2003 | Takashina ............ | H04B 10/079 |
| | | | 398/149 |
| 2011/0069302 A1 | 3/2011 | Hill et al. | |
| 2012/0182023 A1 * | 7/2012 | Zhang ................ | G01M 11/3109 |
| | | | 324/501 |
| 2014/0077971 A1 * | 3/2014 | Archambault .......... | H01S 3/302 |
| | | | 340/870.04 |
| 2016/0187224 A1 * | 6/2016 | Chen .................. | G01M 11/3181 |
| | | | 356/73.1 |
| 2017/0294959 A1 | 10/2017 | Archambault et al. | |
| 2020/0007234 A1 * | 1/2020 | Huang .............. | H04B 10/2589 |
| 2020/0099444 A1 * | 3/2020 | Li ...................... | H04B 10/0795 |
| 2020/0199999 A1 | 6/2020 | Cooper et al. | |
| 2020/0200592 A1 | 6/2020 | Huang et al. | |
| 2020/0266897 A1 * | 8/2020 | Ruggeri ................ | H04B 10/25 |
| 2020/0313763 A1 | 10/2020 | Wang et al. | |
| 2020/0319409 A1 * | 10/2020 | Su ....................... | H04J 14/0209 |
| 2022/0187163 A1 * | 6/2022 | Nakano .............. | G01M 11/3127 |
| 2023/0269019 A1 * | 8/2023 | Huang .............. | G01D 5/35387 |
| | | | 398/48 |
| 2023/0275656 A1 * | 8/2023 | Al Sayeed ......... | H04B 10/0791 |
| | | | 398/13 |
| 2023/0275657 A1 * | 8/2023 | Zhang ................ | H04B 10/2575 |
| 2023/0283385 A1 * | 9/2023 | Ip ........................... | H04B 10/80 |
| | | | 398/115 |
| 2023/0344544 A1 * | 10/2023 | Wilson ................ | H04B 10/071 |

OTHER PUBLICATIONS

Ip et al., "Distributed fiber sensor network using telecom cables as sensing media: technology advancements and applications [Invited]", Journal of Optical Communications and Networking, vol. 14, No. 1, Jan. 2022, pp. A61-A68.

Jia et al., "Experimental Coexistence Investigation of Distributed Acoustic Sensing and Coherent Communication Systems", Optical Fiber Communications Conference and Exhibition (OFC), Jun. 6-10, 2021, 3 pages.

"ASN opens a new era in subsea intelligent sensing based on advanced DAS technology", Alcatel Submarine Networks, Retrieved on Jul. 22, 2023, Webpage available at : https://web.asn.com/en/fiber-sensing/main.html.

Sato et al., "OTDR in Optical Transmission Systems Using Er-Doped Fiber Amplifiers Containing Optical Circulators", IEEE Photonics Technology Letters, vol. 3, No. 11, Nov. 1991, pp. 1001-1003.

Ip et al., "Vibration Detection and Localization Using Modified Digital Coherent Telecom Transponders", Journal of Lightwave Technology, vol. 40, No. 5, Mar. 1, 2022, pp. 1472-1482.

Extended European Search Report received for corresponding European Patent Application No. 22305796.9, dated Nov. 10, 2022, 8 pages.

Decusatis et al., "Fiber Optic Essentials", Academic Press, 2006, 284 pages.

"FiberSense", FiberSense, Retrieved on Jul. 22, 2023, Webpage available at : https://fibersense.com/.

\* cited by examiner

MEASURED OPTICAL SPECTRUM
500

*FIG. 6*

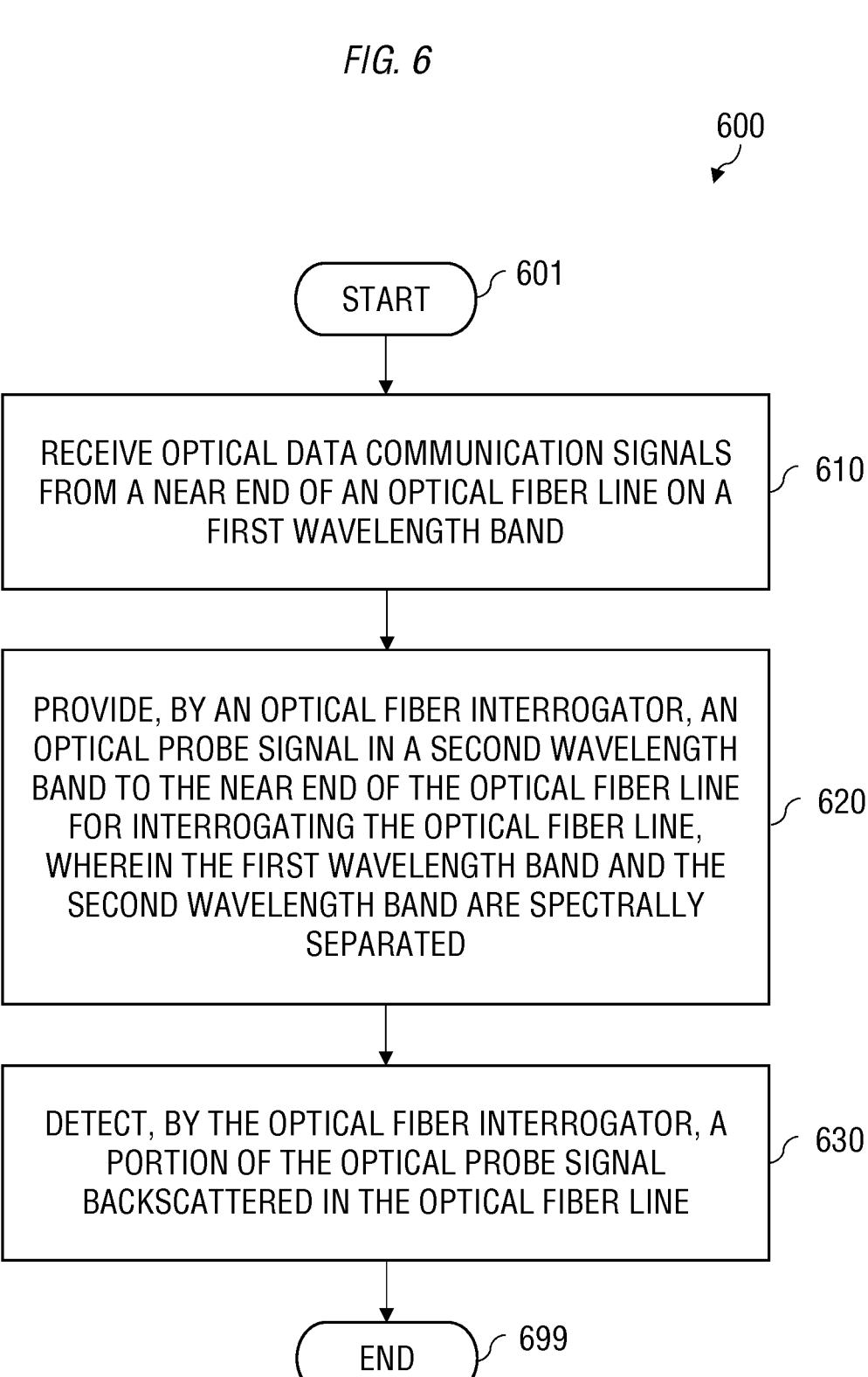

600

START ⌐ 601

RECEIVE OPTICAL DATA COMMUNICATION SIGNALS FROM A NEAR END OF AN OPTICAL FIBER LINE ON A FIRST WAVELENGTH BAND ⌐ 610

PROVIDE, BY AN OPTICAL FIBER INTERROGATOR, AN OPTICAL PROBE SIGNAL IN A SECOND WAVELENGTH BAND TO THE NEAR END OF THE OPTICAL FIBER LINE FOR INTERROGATING THE OPTICAL FIBER LINE, WHEREIN THE FIRST WAVELENGTH BAND AND THE SECOND WAVELENGTH BAND ARE SPECTRALLY SEPARATED ⌐ 620

DETECT, BY THE OPTICAL FIBER INTERROGATOR, A PORTION OF THE OPTICAL PROBE SIGNAL BACKSCATTERED IN THE OPTICAL FIBER LINE ⌐ 630

END ⌐ 699

DISTRIBUTED FIBER OPTIC SENSING ON OPTICAL FIBERS CARRYING TRAFFIC

This application claims the priority of European patent application number 22305796.9 filed on May 31, 2022, the contents of which are incorporated herein by reference in their entirety.

TECHNICAL FIELD

Various example embodiments relate generally to optical metrology and, more particularly but not exclusively, to distributed sensing on fiber optic cables used for telecommunications.

BACKGROUND

In various communication systems, the physical layer may be provided by using fiber optic cables housing optical fibers that propagate optical signals carrying communications. Fiber optic cables may be deployed in a wide variety of environments, including terrestrial environments, marine environments, and so forth. Fiber optic cables, in addition to being used to support communications, also may be used for various distributed sensing applications. For example, distributed sensing may be used for monitoring the fiber optic cables (e.g., for internal and/or external faults or conditions which may impact communications propagating via optical fibers within the fiber optic cables), monitoring the environment surrounding the fiber optic cables, and so forth.

For example, distributed sensing on the fiber optic cables may be used for sensing various conditions which may negatively impact the fiber optic cables and the associated optical data communication signals propagating via optical fibers therein. For example, distributed sensing on a fiber optic cable may be used for localized acoustic or vibrational sensing of conditions such as natural phenomena (e.g., earthquakes, hurricanes, tsunamis, landslides, ocean currents, and so forth), human activity (e.g., construction activity, boating activity (e.g., anchor drops and drags), fishing activity (e.g., trawls and fishing nets), marine maintenance activity (e.g., boulder relocation, trenching, and ploughing), vibrations from railways, and so forth), conditions internal to the fiber optic cable (e.g., electrical cable faults and so forth), conditions associated with the fiber optic cable itself (e.g., cable strumming, cable vibration, and so forth), external aggression (e.g., terrorist attacks), and so forth.

For example, distributed sensing on the fiber optic cables may be used for various opportunistic sensing applications unrelated to propagation of optical data communication signals for telecommunications purposes. For example, distributed sensing on a fiber optic cable may be used for monitoring marine life (e.g., counting whales), monitoring of vessel traffic (e.g. detection of vessels passing over the cable), monitoring environmental conditions (e.g., detection of climate change), monitoring seismic activity (e.g., for earthquake detection and localization, volcano activity monitoring, or the like), performing seismic imaging (e.g., imaging of the seabed sub-surface), fault monitoring of power transmission cables laying nearby or bundled to the fiber optic cable (e.g., electrical faults internal to the power cable), monitoring of pipelines laying nearby or bundled with the fiber optic cable (e.g. leak monitoring, pig tracking, or the like), monitoring of other subsea infrastructure like pumps or compressors (e.g. leak monitoring, integrity monitoring), and so forth.

Distributed sensing on fiber optic cables may be performed using distributed fiber optic sensing (DFOS) techniques. DFOS techniques generally use laser light that is backscattered along a section of optical fiber to measure various local environmental properties or detect temporal changes to such properties. Different types of scattering may be used to support different types of DFOS, such as by using Rayleigh scattering or Brillouin scattering for providing distributed acoustic sensing (DAS), distributed strain sensing (DSS), distributed temperature sensing (DTS), or combined distributed temperature and strain sensing (DTSS), using Raman scattering for providing distributed temperature sensing (DTS), and so forth.

SUMMARY

In at least some example embodiments, an apparatus includes an optical data transceiver and an optical fiber interrogator. The optical data transceiver has a first optical port for transmitting optical data communication signals to a near end of a first optical fiber line and a different second optical port for receiving optical data communication signals from a near end of a different second optical fiber line. The optical fiber interrogator is configured to transmit an optical probe signal to the second optical fiber line via the second optical port and to detect a portion of the optical probe signal backscattered in the second optical fiber line. The optical data communication signals are in a first wavelength band and the optical probe signal is in a second wavelength band spectrally separated from the first wavelength band. In at least some example embodiments, the optical fiber interrogator is connected to receive the backscattered portion from the second optical port. In at least some example embodiments, the first wavelength band is within a conventional optical telecommunication band (C-band) and the second wavelength band is within a long wavelength optical telecommunication band (L-band). In at least some example embodiments, the C-band includes wavelengths in a range between about 1535 nm and about 1568 nm and L-band includes wavelengths in a range between about 1565 nm and about 1625 nm. In at least some example embodiments, the second wavelength band is at least 2 nm outside of the first wavelength band. In at least some example embodiments, the first wavelength band includes wavelengths in a range between about 1535 nm and about 1568 nm and the second wavelength band is at least 2 nm outside of the first wavelength band. In at least some example embodiments, the optical fiber interrogator is configured to perform, based on the detected portion of the optical probe signal backscattered in the optical fiber line, at least one of determining locations of sensed events along the optical fiber line, determining times of sensed events along the optical fiber line, or recording signals of sensed events along the optical fiber line. In at least some example embodiments, the apparatus further includes an optical wavelength multiplexer configured to direct the optical data communication signals from the second optical fiber line to the optical data transceiver and to direct the optical probe signal to the second optical fiber line. In at least some example embodiments, the apparatus further includes an optical wavelength multiplexer configured to direct the optical data communication signals from the second optical fiber line to the optical data transceiver and to direct the portion of the optical probe signal backscattered in the second optical fiber line to the optical fiber interrogator. In at least some example embodiments, the optical fiber interrogator includes an optical transmitter configured to provide the optical probe signal for interrogating the second optical fiber line and an optical receiver configured to detect the portion of the optical probe signal backscattered in the second optical fiber line.

In at least some example embodiments, a method includes receiving optical data communication signals from a near end of an optical fiber line on a first wavelength band, providing, by an optical fiber interrogator, an optical probe signal in a second wavelength band to the near end of the optical fiber line for interrogating the optical fiber line, wherein the first wavelength band and the second wavelength band are spectrally separated, and detecting, by the optical fiber interrogator, a portion of the optical probe signal backscattered in the optical fiber line. In at least some example embodiments, the optical fiber interrogator is connected to receive the backscattered portion from the same near end. In at least some example embodiments, the first wavelength band is within a conventional optical telecommunication band (C-band) and the second wavelength band is within a long wavelength optical telecommunication band (L-band). In at least some example embodiments, the second wavelength band is at least 2 nm outside of the first wavelength band. In at least some example embodiments, the method further includes performing, based on the detected portion of the optical probe signal backscattered in the optical fiber line, at least one of determining locations of sensed events along the optical fiber line, determining times of sensed events along the optical fiber line, or recording signals of sensed events along the optical fiber line.

BRIEF DESCRIPTION OF THE DRAWINGS

The teachings herein can be readily understood by considering the following detailed description in conjunction with the accompanying drawings, in which:

FIG. 2 depicts an example embodiment of an optical communication system configured to perform distributed fiber optic sensing on the receive side of a fiber optic cable based on interrogation of an optical fiber configured to carry communication channels using an interrogation channel where the communication channels and the interrogation channel are spectrally separated;

FIG. 3 depicts an example embodiment of an optical fiber interrogator for interrogating an optical fiber including data communication wavelength channels based on an interrogation wavelength channel where the data communication wavelength channels and the interrogation wavelength channel are spectrally separated;

FIG. 6 depicts an example embodiment of a method for use by an optical fiber interrogator for supporting distributed fiber optic sensing via a fiber optic cable based on interrogation of an optical fiber carrying data communication wavelength channels using an interrogation wavelength channel where the data communication wavelength channels and the interrogation wavelength channel are spectrally separated.

To facilitate understanding, identical reference numerals have been used herein, wherever possible, in order to designate substantially similar or identical elements that are common among the various figures.

DETAILED DESCRIPTION

Figure 1:
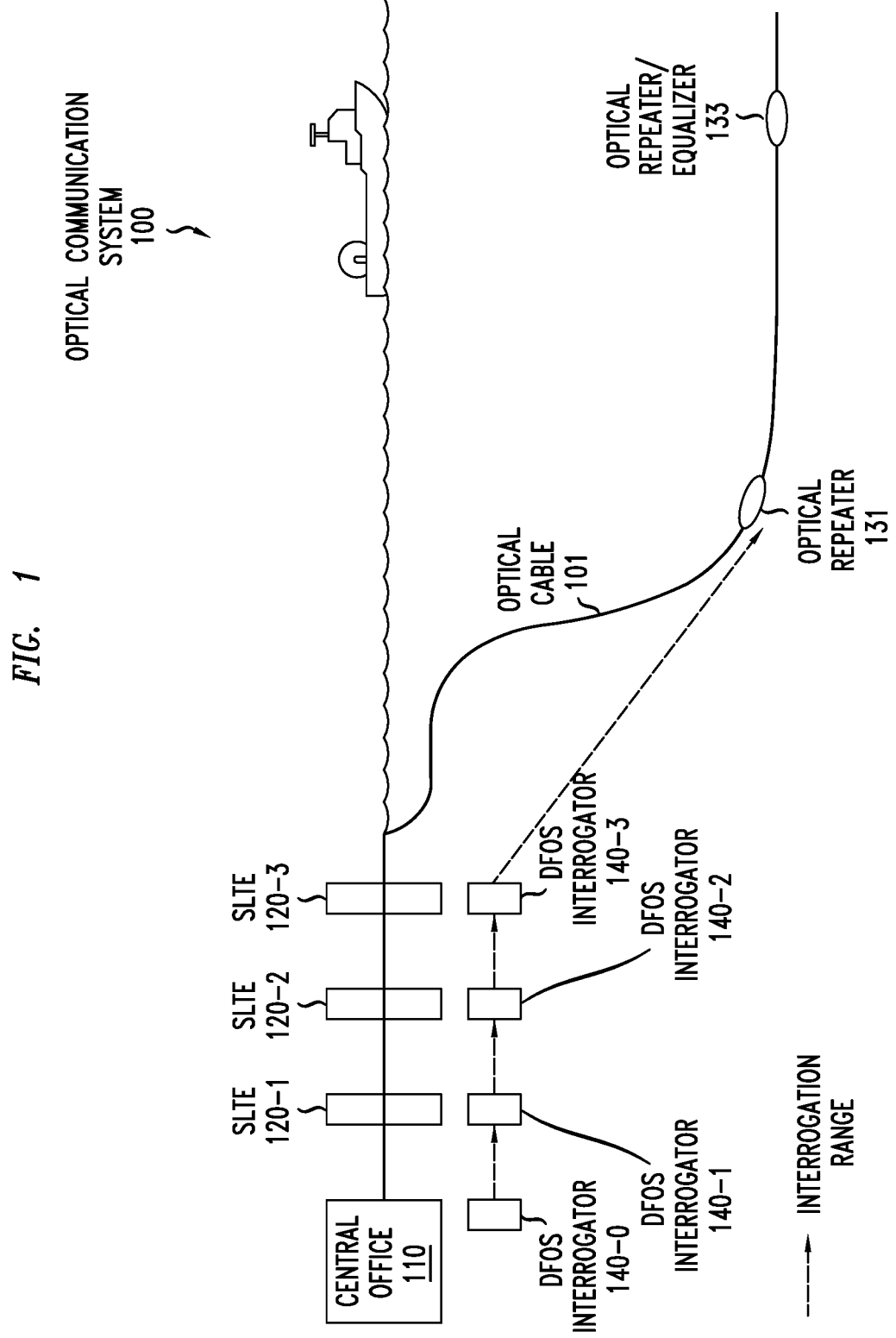
FIG. 1 depicts an example embodiment of an optical communication system configured to support distributed fiber optic sensing via a fiber optic cable based on interrogation of an optical fiber carrying communication channels using an interrogation channel where the communication channels and the interrogation channel are spectrally separated in the optical frequency or wavelength domain.

Various example embodiments for supporting distributed fiber optic sensing are presented. Various example embodiments for supporting distributed fiber optic sensing may be configured to support distributed fiber optic sensing via fiber optic cables. Various example embodiments for supporting distributed fiber optic sensing via a fiber optic cable may be configured to support distributed fiber optic sensing based on interrogation of an optical fiber of the fiber optic cable that is also configured to carry communications. Various example embodiments for supporting distributed fiber optic sensing of a fiber optic cable may be configured to support distributed fiber optic sensing of a fiber optic cable based on interrogation of an optical fiber of the fiber optic cable that is also configured to carry optical data communication channels using an optical interrogation channel where the optical data communication channels and the optical interrogation channel are spectrally separated. Various example embodiments for supporting distributed fiber optic sensing via a fiber optic cable may be configured to support distributed fiber optic sensing via a fiber optic cable based on interrogation of an optical fiber of the fiber optic cable using an optical interrogation channel where the optical data communication channels are in a first wavelength band and the optical interrogation channel is in a second wavelength band spectrally separated from the first wavelength band. Various example embodiments for supporting distributed fiber optic sensing via a fiber optic cable may be configured to support distributed fiber optic sensing via a fiber optic cable based on interrogation of an optical fiber of the fiber optic cable using an optical interrogation channel where the optical data communication channels are in a first wavelength band and the optical interrogation channel is in a second wavelength band spectrally separated from the first wavelength band, where the spectral separation is at least 2 nm (e.g., 2 nm, 5 nm, 8 nm, or using any other suitable amount of spectral separation). Various example embodiments for supporting distributed fiber optic sensing via a fiber optic cable may be configured to support distributed fiber optic sensing based on interrogation of an optical fiber of the fiber optic cable that is carrying optical data communication channels using an optical interrogation channel where the optical data communication channels are in the "conventional" wavelength band (i.e., the C-band, which is traditionally between about 1530 nm-1565 nm) and the spectrally separated optical interrogation channel is in the "long" wavelength band (i.e., the L-band, which is traditionally between about 1565 nm-1625 nm). Various example embodiments for supporting distributed fiber optic sensing via a fiber optic cable may be configured to support distributed fiber optic sensing using various types of optical reflectometry, such as Rayleigh-scattering-based reflectometry, Brillouin-scattering-based reflectometry, Raman-scattering-based reflectometry, or the like, as well as various combinations thereof. Various example embodiments for supporting distributed fiber optic sensing via a fiber optic cable may be configured to support distributed fiber optic sensing using various distributed fiber optic sensing (DFOS) techniques (e.g., DAS, DSS, DTS, DTSS, or the like, as well as various combinations thereof). Various example embodiments for supporting distributed fiber optic sensing via a fiber optic cable may be configured to support distributed fiber optic sensing of various types of optical fiber links, such as repeatered links (e.g., links using discrete, locally-pumped optical amplifiers), unrepeatered links (e.g., using remotely optically pumped optical amplification, e.g., based on remotely optically pumped erbium doped fiber based amplification and/or remotely optically pumped Raman amplification), passive optical networks (e.g., non-optically-amplified links, such as "last mile" connections), and so forth. It will be appreciated that these and various other example embodiments and advantages or potential advantages of supporting distributed fiber optic sensing of fiber optic cables may be further understood by way of reference to the various figures, which are discussed further below.

FIG. 1 depicts an example embodiment of an optical communication system configured to support distributed fiber optic sensing via a fiber optic cable based on interrogation of an optical fiber thereof, wherein the optical fiber is configured to also carry optical data communication channels. The distributed fiber optic sensing uses an optical interrogation channel where the optical data communication channels and the optical interrogation channel are spectrally separated in the optical frequency or wavelength domain.

The optical communication system 100 is a repeatered, submarine cable, optical communication system. The optical communication system 100 includes an optical cable 101, a central office 110, a set of submarine line terminal equipments (SLTEs) 120-1 to 120-3 (collectively, SLTEs 120), an optical repeater 131, an optical repeater/equalizer 133), and a set of DFOS interrogators 140-0 to 140-3 (collectively, DFOS interrogators 140).

The optical cable 101 is a fiber optic cable that terminates at the central office 110. The portion of the optical cable 101 between the central office 110 and the SLTE 120-3 will be understood to be a terrestrial portion of the optical cable 101, while the portion of the cable after the SLTE 120-3 will be understood to be the submarine portion of the optical cable 101. The terrestrial portion of the optical cable 101 traverses each of the SLTEs 120, with the SLTE 120-1 being closest to the central office 110 and the SLTE 120-3 being closest to the point at which the cable 101 enters the water. The submarine portion of the optical cable 101 connects to the optical repeater 131 and has the optical repeater/equalizer 133 thereon.

The optical cable 101 will be understood to include one or more optical fiber pairs (omitted for purposes of clarity) with each of the one or more optical fiber pairs including a transmit optical fiber for transmission of optical signals over the optical cable 101 and a receive optical fiber for reception of optical signals over the optical cable 101. It will be appreciated that each of the optical fibers of the optical cable 101 may support propagation of a single optical signal or multiple optical signals (e.g., based on wavelength division multiplexing (WDM), dense WDM (DWDM), or the like).

The central office 110, SLTEs 120, optical repeater 131, and optical repeater/equalizer 133 support propagation of optical wavelength communication channels over the optical fibers within the optical cable 101.

The DFOS interrogators 140 are configured to interrogate optical fibers within the optical cable 101 on spans of the optical cable 101. For example, DFOS interrogator 140-0 is configured to interrogate one or more optical fibers within the optical cable 101 on the span of the optical cable 101 between the central office 110 and the SLTE 120-1, DFOS interrogator 140-1 is configured to interrogate one or more optical fibers within the optical cable 101 on the span of the optical cable 101 between the SLTE 120-1 and the SLTE 120-2, DFOS interrogator 140-2 is configured to interrogate one or more optical fibers within the optical cable 101 on the span of the optical cable 101 between the SLTE 120-2 and the SLTE 120-3, and the DFOS interrogator 140-3 is configured to interrogate one or more fibers within the optical cable 101 on the span of the optical cable 101 between the SLTE 120-3 and the optical repeater 131. It will be appreciated that, although primarily presented with respect to example embodiments in which each of the DFOS interrogators 140 interrogates only a single span of optical fiber, in at least some example embodiments one or more of the DFOS interrogators 140 may be configured to interrogate multiple terrestrial optical fiber spans (although it is noted that such interrogation of multiple terrestrial optical fiber spans may rely on bypass routing to bypass amplifiers at SLTEs 120 between the spans being interrogated). It will be appreciated that fewer or more DFOS interrogators 140 may be deployed to support interrogation of optical fibers within fewer or more spans of the optical cable 101.

The DFOS interrogators 140 may interrogate receive optical fibers on the optical cable 101 and/or transmit optical fibers on the optical cable 101; however, various example embodiments are primarily presented herein within the context of supporting interrogation of receive optical fibers.

The DFOS interrogators 140 may interrogate optical fibers on the optical cable 101 using various DFOS techniques, such as DAS, DSS, DTS, DTSS, or the like, as well as various combinations thereof.

The DFOS interrogators 140 may interrogate optical fibers on the optical cable 101 using optical interrogation signals operating at wavelengths outside of the optical wavelength band of the optical data communication signals transported by the optical fibers on the optical cable 101.

In at least some example embodiments, the optical data communication channels may operate in the "conventional" wavelength band (i.e., the C-band, which is traditionally between about 1530 nm-1565 nm) while the optical interrogation signal may be in the "long" wavelength band (i.e., the L-band, which is traditionally between about 1565 nm-1625 nm). It will be appreciated that, for submarine repeatered systems, the C-band may be fully utilized for optical data communication channels; however, the L-band generally is not utilized for optical data communication channels and, given the advent of spatial division multiplexing (SDM) which provides a more attractive solution with lower system cost per bit, is unlikely to be utilized for optical data communication channels in submarine repeatered systems in the near future.

In at least some example embodiments, the optical interrogation signals may operate at wavelengths significantly outside of the optical wavelength band of the optical data communication signals transported by the optical fibers on the optical cable 101. It is noted that locating the DFOS interrogation wavelength significantly outside of the optical wavelength band of the optical data communication signals may provide certain advantages. For example, a significant wavelength separation between the DFOS interrogation channel and the optical data communication channels supporting customer traffic will reduce the risk of optical cross coupling (e.g. by optical non-linear interactions in the fiber)

from the DFOS interrogation channel to the optical data communication channels supporting customer optical communication traffic. For example, for optically amplified telecom links, this eliminates the existence of noise ASE light inside of the optical bandwidth for the DFOS signal as the amplifiers do not emit the same level of noise ASE light far outside of the optical bandwidth of the optical data transmission channels, thereby reducing or eliminating the risk of DFOS data quality degradation introduced by ASE noise.

In at least some example embodiments, the optical interrogation signals may operate at wavelengths that are sufficiently close to the C-band where the optical wavelength band of the optical data communication signals is located within the C-band. It is noted that, in the case in which DFOS is implemented using DAS, locating the DFOS interrogation wavelength close to the C-band may provide certain advantages. For example, this may provide minimum impact on the DFOS sensitivity performance or the DFOS sensing range capability (fiber range) as compared with a DFOS interrogator operating in the C-band. For example, since fiber losses increase outside of the C-band (thereby reducing the DFOS sensing range capability (fiber range)), locating the DFOS interrogation wavelength close to the C-band may maintain DFOS sensing range capability. For example, in the case in which DFOS is implemented using DAS, and for premium system performance, a DAS interrogator requires a laser source with a very low frequency noise (i.e. very narrow linewidth) and, since such low noise lasers typically are not available far outside of the Erbium amplification band, locating the DAS wavelength close to the C-band may be beneficial.

In at least some example embodiments, the optical interrogation signals may operate at wavelengths that are far enough outside of the optical wavelength band of the optical data communication signals to realize potential benefits and that are sufficiently close to the C-band to realize potential benefits.

In at least some such example embodiments, the optical interrogation signals may operate at the low end of the L-band, which may be considered to be significantly outside of the optical wavelength band of the optical data communication signals while also being sufficiently close to the C-band. For example, in at least some example embodiments, the DFOS interrogation signal is an International Telecommunications Union (ITU) L00 signal having an optical frequency/wavelength equal to 190000 GHz/1577.86 nm; however, it will be appreciated that various other optical wavelengths may be used for the DFOS interrogation signal.

The DFOS interrogators 140 may interrogate optical fibers on the optical cable 101 based on use of a wavelength division multiplexor to couple the optical interrogation signals into the optical fibers on the optical cable 101 (e.g., using a C/L WDM that is configured to pass optical data communication signals in the C-band and reflect optical interrogation signals in the L-band for counter-propagation on receive optical fibers on the optical cable 101).

It will be appreciated that, although primarily presented with respect to supporting monitoring of optical fibers, based on L-band DFOS, on a particular type of optical fiber (illustratively, on terrestrial and submarine repeatered cable links), monitoring of optical fibers based on L-band DFOS may be supported on other types of optical fibers.

For example, the principle of operation for L-band DFOS on an unrepeatered submarine optical cable link (i.e., with remote optical amplification) may be the same as for L-band DFOS on repeatered submarine optical links as presented with respect to FIG. 1; however, in this case, the repeaters (wet and dry) may be replaced by remotely optically-pumped amplifiers (ROPAs) and, further, the DFOS interrogation may cover the span from SLTE terminal down to the first ROPA.

For example, the principle of operation for L-band DFOS on a terrestrial (repeatered or unrepeatered) link may be the same as for L-band DFOS on the dry part of FIG. 1; however, in this case, only dry repeaters (or pumps) are present, which facilitates the co-location of DFOS interrogators with each of the dry repeaters (or pumps).

For example, for L-band DFOS on a passive optical network (PON) without amplification, the L-band DFOS can cover the full span link with DFOS interrogators located at the cable ends.

It will be appreciated that, although primarily presented with respect to supporting monitoring of optical fibers based on L-band DFOS on particular types of optical fiber links, L-band DFOS may be applied within various other contexts for supporting monitoring of optical fiber links.

In various other example embodiments, each of the SLTEs 120-1 to 120-3 may be replaced by a conventional optical data transceiver, which is capable of optically communicating data on a set of optical wavelengths such that the optical data communications are received therein from a first optical fiber line and transmitted therefrom on a different second optical fiber line.

Figure 2:
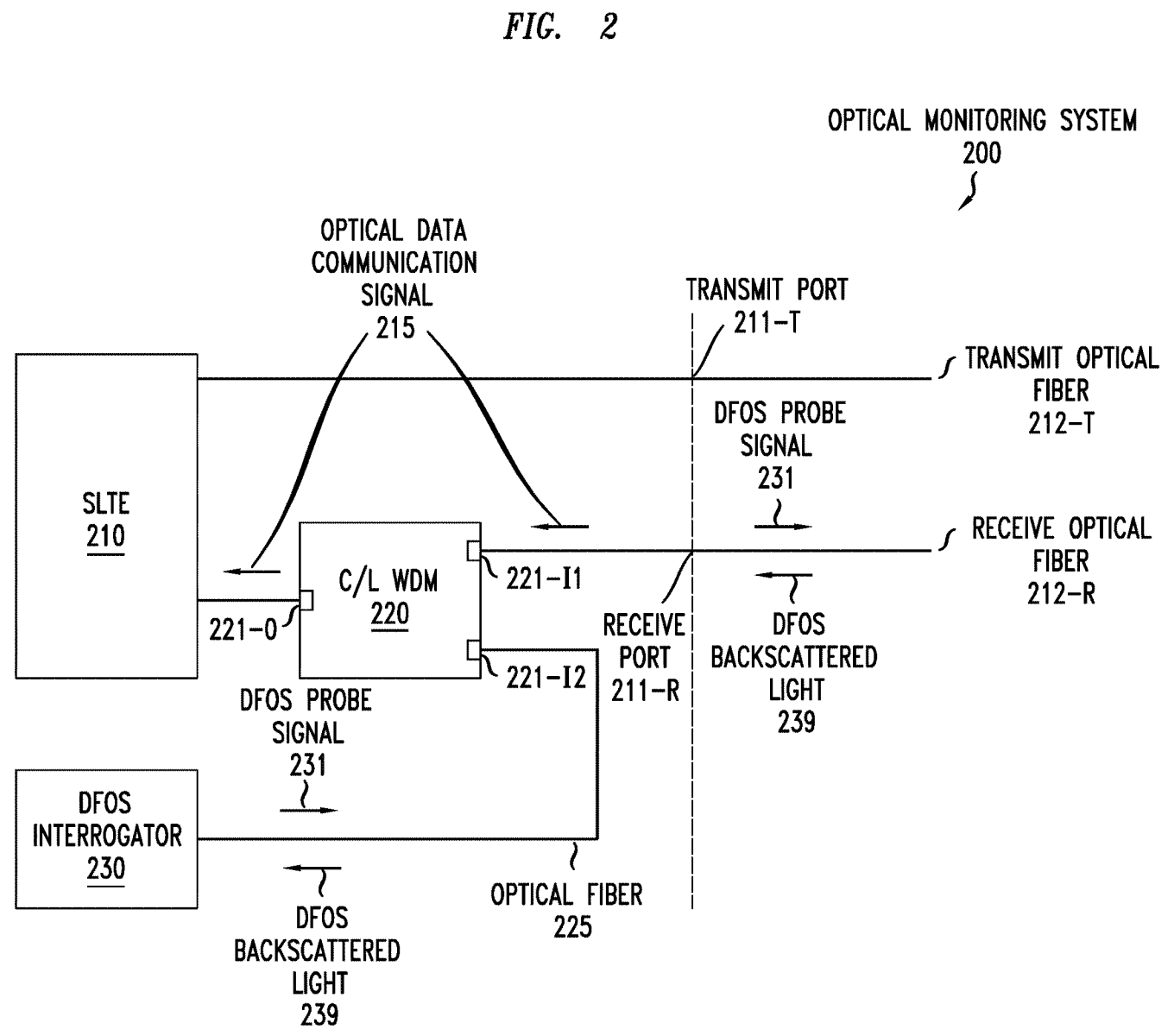

FIG. 2 depicts an example embodiment of an optical communication system configured to perform distributed fiber optic sensing on the receive side of a fiber optic cable based on interrogation of an optical fiber configured to carry optical data communication channels to the node having the interrogator for distributed fiber optic sensing. The interrogator uses an interrogation wavelength channel spectrally separated from the optical wavelength channels used for the optical data communication channels.

The optical monitoring system 200 is configured to perform distributed fiber optic sensing on the receive side of the fiber optic cable based on DFOS, which will be understood to include DFOS techniques such as DAS, DSS, DTS, DTSS, or the like.

The optical monitoring system 200 includes a submarine line terminal equipment (SLTE) 210, an optical C-band and optical L-band (C/L) wavelength division multiplexer (WDM) 220, and a DFOS interrogator 230. As illustrated in FIG. 2, the SLTE 210, the C/L WDM 220, and the DFOS interrogator 230 may be considered to form part of local terminal equipment, which may interface with optical fibers used by the SLTE 210 for supporting optical communication of data communication wavelength channels transporting customer data traffic.

In various other example embodiments, the SLTE 210 of FIG. 2 may be replaced by a conventional optical data transceiver capable of optically communicating data on a set of optical wavelength channels such that optical data communications are received therein from a near end of one optical fiber line and transmitted therefrom via a near end of a different second optical fiber line. In such embodiments, the optical data transceiver may have properties as described herein for the SLTE 210 of FIG. 2.

The SLTE 210 supports communication of customer data traffic over optical data communication signals propagated over optical fibers. The SLTE 210 supports a transmit port 211-T associated with a transmit optical fiber 212-T and a receive port 211-R associated with a receive optical fiber 212-R. The SLTE 210 supports transmission of optical data communication signals via the transmit port 211-T for propagation over the transit optical fiber 212-T. The SLTE 210 supports reception of optical data communication signals via the receive port 211-R after propagation over the receive optical fiber 212-R. The optical data communication signal received via the receive port 211-R after propagation over the receive optical fiber 212-R is denoted as optical data communication signal 215. It will be appreciated that the optical data communication signals are carried by WDM wavelength channels that cover a range of wavelengths which may be referred to herein as a range of data communication wavelengths.

The C/L WDM 220 and the DFOS interrogator 230 are configured to cooperate to support optical monitoring of the receive optical fiber 212-R using DFOS techniques. The C/L WDM 220 is configured to facilitate interrogation of the receive optical fiber 212-R by the DFOS interrogator 230 using DFOS techniques by supporting both coupling of the optical data communication signal 215 between the receive optical fiber 212-R and the SLTE 210 and coupling of DFOS interrogation signals between the DFOS interrogator 230 and the receive optical fiber 212-R for interrogation of the receive optical fiber 212-R. The C/L WDM 220, in the receive direction toward the SLTE 210, includes two input ports 221-I (illustratively, a first input port 221-I1 that is coupled to the receive optical fiber 212-R and a second input port 221-I2 that is coupled by an optical fiber 225 to the DFOS interrogator 230) and an output port 221-O that is coupled to the receive input of the SLTE 210. The DFOS interrogator 230 is configured to control interrogation of the receive optical fiber 212-R using DFOS techniques.

The DFOS interrogator 230 is configured to generate a DFOS probe signal 231 configured for use in interrogating the receive optical fiber 212-R based on use of DFOS. The DFOS probe signal 231 is an optical signal having a wavelength spectrally separated from the set of wavelengths of the optical data communication signal 215 received over the receive optical fiber 212-R via the receive port 211-R. The DFOS probe signal 231 is, e.g., generated in the L-band while the optical data communication signal 215 received over the receive optical fiber 212-R is in the C-band. The DFOS interrogator 230 transmits the DFOS probe signal 231 to the optical fiber 225 between the DFOS interrogator 230 and the second input port 221-I2 of the C/L WDM 220. The C/L WDM 220 reflects the DFOS probe signal 231 such that the DFOS probe signal 231, rather than passing through the C/L WDM 230 to the SLTE 210 as the optical data communication signal 215 does, is transmitted to the receive optical fiber 212-R, i.e., via reflection of the DFOS probe signal 231 to the receive optical fiber 212-R. This action causes counter-propagation of the DFOS probe signal 231 over the receive optical fiber 212-R. The DFOS probe signal 231 counter-propagates over the receive optical fiber 212-R until being back scattered therein or reaching a first blocking element, i.e., omitted for clarity in FIG. 2. The blocking element blocks the DFOS probe signal 231 from further counter-direction propagation in the receive optical fiber 212-R and may be, e.g., a first optical repeater, an optical isolator or other suitable optical blocking component. The reflection of the DFOS probe signal 231 into the receive optical fiber 212-R and counter-propagation of the DFOS probe signal 231 over the closest segment of the receive optical fiber 212-R results in generation of DFOS backscattered light 239, which propagates over the receive optical fiber 212-R in a direction toward the SLTE 210 until reaching the first input port 221-I1 of the C/L WDM 220. The DFOS backscattered light 239 is reflected by the C/L WDM 220 such that the DFOS backscattered light 239, rather than passing through the C/L WDM 220 to the SLTE 210 as the optical data communication channels do, is reflected back into the optical fiber 225 to be conducted back to the DFOS interrogator 230.

The DFOS interrogator 230 may then initiate a process for causing an analysis of the DFOS probe signal 231 and the associated DFOS backscattered light 239 in order to generate fiber optic analysis information for the receive optical fiber 212-R. For example, the DFOS interrogator 230 may provide the DFOS probe signal 231 and the associated DFOS backscattered light 239, or information representing or describing the DFOS probe signal 231 and the associated DFOS backscattered light 239, to one or more other devices which may then generate the fiber optic analysis information for the receive optical fiber 212-R. It will be appreciated that the fiber optic analysis information that is generated based on the DFOS probe signal 231 and the associated DFOS backscattered light 239 may be generated in various other ways, e.g., for acoustic sensing of events near or along the receive optical fiber.

It will be appreciated that, although primarily presented with respect to a specific arrangement of the SLTE 210, the C/L WDM 220, and the DFOS interrogator 230 as illustrated in FIG. 2 (e.g., in which the C/L WDM 220 is configured to pass C-band signals and reflect L-band signals), various other arrangements of the SLTE 210, C/L WDM 220, and SLTE 230 may be used while still supporting distributed fiber optic sensing on the receive side of the fiber optic cable based on DFOS (e.g., the C/L WDM 220 may be configured to reflect C-band signals and pass L-band signals). For example, the locations of the SLTE 210 and the DFOS interrogator relative to the C/L WDM 220 may be switched, such that the optical data communication signal 215 received over the receive optical fiber 212-R is reflected and directed to the SLTE 210, the DFOS probe signal 231 passes through the C/L WDM 220 for counter-propagation on the receive optical fiber 212-R, and the DFOS backscattering received over the receive optical fiber 212-R passes through the C/L WDM to the DFOS interrogator 230. It will be appreciated that various other arrangements of the SLTE 210, C/L WDM 220, and SLTE 230 may be used while still supporting distributed fiber optic sensing on the receive side of the fiber optic cable.

It will be appreciated that, although primarily presented with respect to a specific arrangement of elements supporting optical monitoring, optical monitoring system 200 may be implemented using other arrangements of elements, using various types of DFOS (e.g. DAS, DSS, DTS, DTSS, or the like), using DFOS techniques based on various types of backscattering (e.g., Rayleigh backscattering, Brillouin backscattering, Raman backscattering, and so forth), or the like, as well as various combinations thereof.

Figure 3:
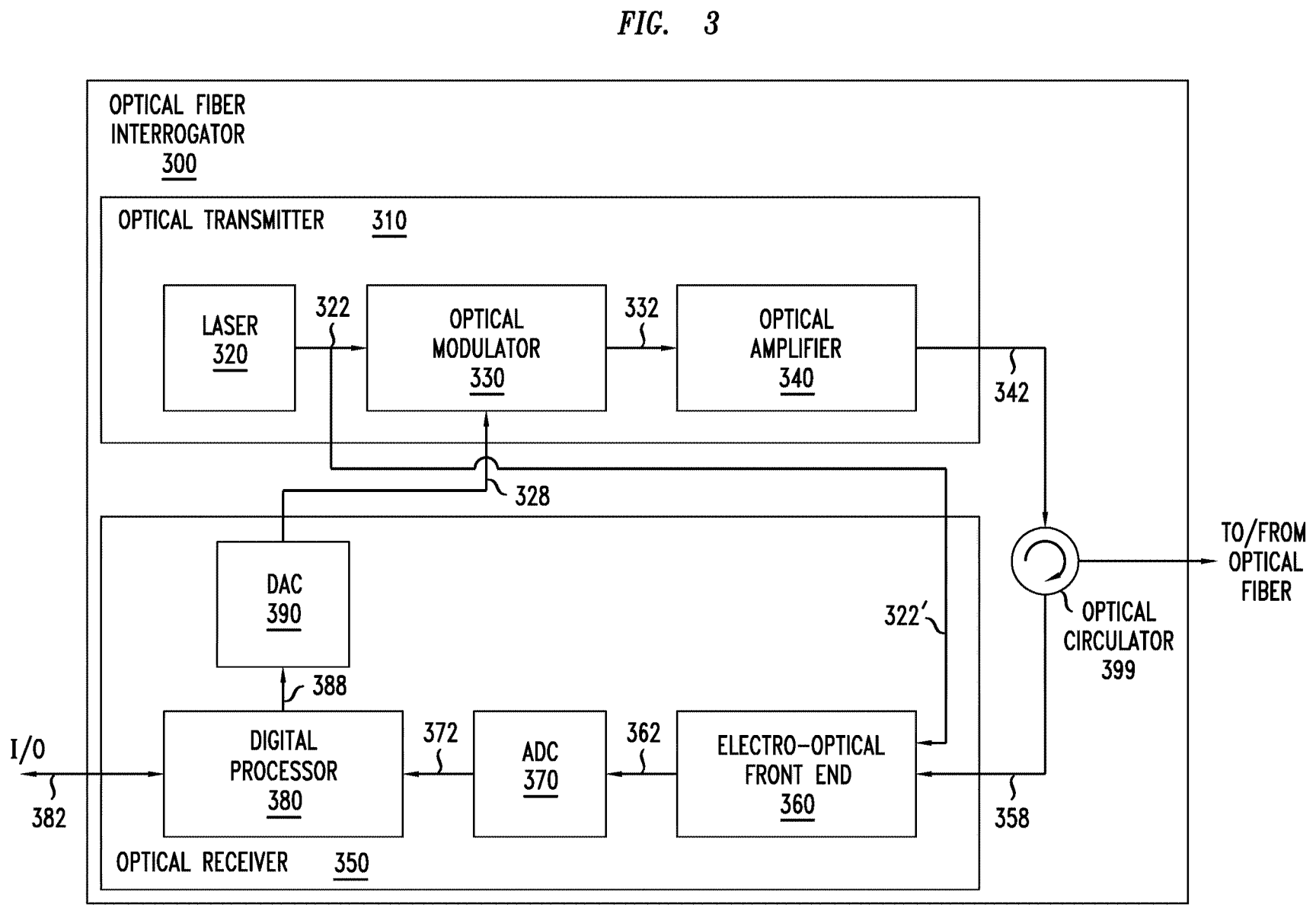

FIG. 3 depicts an example embodiment of an optical fiber interrogator for interrogating an optical fiber including data communication wavelength channels based on an interrogation wavelength channel where the data communication wavelength channels and the interrogation wavelength channel are spectrally separated.

The optical fiber interrogator 300 is configured to support interrogation of an optical fiber transporting data communication wavelength channels based on use of an interrogation wavelength channel where the data communication wavelength channels and the interrogation wavelength channel are spectrally separated in wavelength. It will be appreciated that the optical fiber interrogator 300 may be used as one of the DFOS interrogators 140 of FIG. 1 or as the DFOS interrogator 230 of FIG. 2.

The optical fiber interrogator 300 is configured to support interrogation of an optical fiber based on various DFOS techniques to obtain various measurements which may be used for the distributed sensing of fiber optic cables (e.g., DAS measurements where DAS is used, DSS measurements where DSS is used, DTS measurements where DTS is used, DTSS measurements where DTSS is used, or the like, as well as various combinations thereof). It will be appreciated that the optical fiber interrogator 300 may be configured to collect various other types of measurements while supporting interrogation of an optical fiber transporting data communication wavelength channels based on use of an interrogation wavelength channel where the data communication wavelength channels and the interrogation wavelength channel are substantially shifted or isolated in wavelength, e.g., to greatly reduce optical crosstalk due to nonlinear optical interactions of the two types of wavelength channels and to significantly reduce the coupling of ASE noise of optical amplifier(s) to the optical fiber interrogator 300.

The optical fiber interrogator 300 includes an optical transmitter 310, an optical receiver 350, and an optical circulator 399. The optical transmitter 310 includes a laser 320, an optical modulator 330, and optionally an optical amplifier 340. The optical receiver 350 includes an electro-optical front end (FE) 360, an analog-to-digital converter (ADC) 370, a digital processor 380, and a digital-to-analog converter (DAC) 390. The optical circulator 399 is configured to enable optical transmitter 310 and optical receiver 350 to interface with an optical fiber (which is omitted for purposes of clarity), e.g., optical fiber 225 of FIG. 2.

In operation, the optical transmitter 310 generates the optical interrogation signal, which is typically amplitude and/or phase and/or polarization modulated with a known pattern to enable interrogation of the optical fiber to be interrogated. The laser 320 generates an output light beam 322 having wavelength $\lambda_k$. The laser 320 is configured such that the wavelength $\lambda_k$ of the output light beam 322 is spectrally separated in wavelength from the set of wavelengths of the optical data communication channels propagating on the optical fiber that is to be interrogated using the output light beam 322. For example, the wavelength $\lambda_k$ of the output light beam 322 may be in the L-band (e.g., in a range between about 1565 nm and about 1625 nm, such as by using a band at about 1577.86 nm). A portion 322' (e.g., approximately 10% of the optical power, approximately 20% of the optical power, or the like) of the output light beam 322 is directed to the electro-optical front end 360 of the optical receiver 350, and the remainder of the output light beam 322 is directed to the optical modulator 330 of the optical transmitter 310. The optical modulator 330 modulates the received light in response to an electrical drive signal 328 received from DAC 390, thereby generating, e.g., a pre-selected, phase and/or amplitude and/or polarization pattern-modulated optical signal 332. The optional optical amplifier 340 amplifies the pattern-modulated optical signal 332, thereby generating an amplified optical interrogator signal 342, which is then directed to the optical circulator 399 such that the amplified optical interrogator or probe signal 342 may be directed toward the optical fiber to be interrogated (e.g., to the optical fiber 225 for reflection onto the receive optical fiber 212-R to be interrogated). It will be appreciated that the amplified optical interrogator or probe signal 342 is an example of one of the above-mentioned optical probe signals (e.g., DFOS probe signal 231 of FIG. 2).

In operation, the DAC 390 generates the electrical drive signal 328 that drives the optical modulator 330 for controlling various aspects of the amplified optical interrogator or probe signal 342 that is used to interrogate the optical fiber to be interrogated. The DAC 390 may generate the electrical drive signal 328 in response to a digital signal 388 received from the digital processor 380. In at least some example embodiments, for example, the digital signal 388 is such that the pattern-modulated optical signal 332 output by the optical modulator 330 is a pulsed optical signal suitable for DFOS measurements. In at least some example embodiments, for example, the digital signal 388 is configured to cause the pattern-modulated optical signal 332 to have a waveform that facilitates DFOS measurements, e.g., in terms of achieving a specified signal-to-noise ratio (SNR) for DFOS measurements, a specified spatial resolution for DFOS measurements, or the like, as well as various combinations thereof. In at least some example embodiments, for example, the digital signal 388 may be configured to make the pattern-modulated optical signal 332 suitable for an application of matched-filtering techniques in the processing of the corresponding optical response signal 358. It will be appreciated that the DAC 390, although depicted as forming part of the optical receiver 350, may form part of the optical transmitter 310 or may be implemented as a stand-alone element that is not considered to be part of the optical transmitter 310 or the optical receiver 350.

In operation, the optical receiver 350 receives the optical response signal that results from interrogation of the optical fiber to be interrogated and processes the optical response signal to obtain optical fiber analysis information (e.g., to obtain various measurements which may be used for the distributed sensing of fiber optic cables). The electro-optical front end 360 receives an optical response signal 358, from the optical fiber to be interrogated, via the optical circulator 399. The electro-optical front end 360 operates to convert optical response signal 358 into one or more corresponding electrical signals 362. In at least some example embodiments, for example, the electro-optical front end 360 is configured for coherent detection of optical response signal 358 by optically mixing this signal with the portion 322' of the output light beam 322 to produce interference therewith with different relative phase differences. The corresponding hardware of electro-optical front end 360 may include a 90-degree optical hybrid and one or more photodetectors, e.g., conventional pairs of matched photodiodes in back-to-back configurations to enable differential detection of different phases of mixtures of the response signal 358 and the portion 322' from the 90-degree optical hybrid or the like). The ADC 370 operates to convert the one or more electrical signals 362 generated by electro-optical front end 360 into the corresponding one or more streams 372 of digital samples, e.g., sampling approximate in-phase and quadrature-phase components of the response signal 358 and/or sampling approximate two orthogonal polarization components of the response signal 358. The digital samples 372 are then processed in the digital processor 380 using a suitable signal-processing algorithm to obtain measurements of a selected characteristic of the corresponding optical fiber being interrogated. For example, the digital samples 372 may be processed for determining locations of sensed events along the receive optical fiber, determining times of sensed events along the receive optical fiber, recording signals of sensed events along the receive optical fiber, or the like, as well as various combinations thereof. For example, where the digital samples 372 are used for recording signals of sensed events along the receive optical fiber, the actual signal of the measurand may be reconstructed (e.g., temperature, strain, acoustic signal, vibration signal, and so forth) and, in the case of an acoustic or vibration signal source, the signature of the acoustic or vibration signal source (e.g., animals, speech, earthquakes, hurricanes, tsunamis, landslides, ocean currents, anchor drops and drags, fishing gear, vessel traffic, trenching, railways, cable strumming, seismic waves, fault signals from power transmission cables, pipelines, or the like) may be determined. It will be appreciated that such signal processing capabilities may be used for various purposes, such as for detecting the presence of mechanical vibrations, detecting fiber faults, detecting localized strain changes, detecting localized temperature excursions, detecting acoustic signals or signatures, detecting vibrations signals or signatures, and so forth.

As illustrated in FIG. 3, the optical fiber interrogator 300 also may support an input/output (I/O) port 382, interfaced with the digital processor 380 of the optical receiver 350, which may be used to export the measurement results obtained based on interrogation of the optical fiber (e.g., to one or more external systems for one or more of localized fiber event reporting, additional analysis, or the like, as well as various combinations thereof), to receive instructions from an external controller (e.g., for configuration changes on the optical fiber interrogator 300), or the like, as well as various combinations thereof.

It will be appreciated that the optical fiber interrogator 300, although primarily presented as including specific types and arrangements of elements for interrogating an optical fiber to support DFOS on fiber optic cables, may be implemented using various other arrangements of the depicted elements, may be implemented using various other elements, or the like, as well as various combinations thereof. For example, in at least some example embodiments the optical fiber interrogator 300 may be implemented without optional optical amplifier 340. For example, in at least some example embodiments the optical fiber interrogator 300 may be implemented without the local oscillator arm, i.e., for non-coherent detection of fiber events, e.g., using conventional optical time domain reflectometry (OTDR) methods. It will be appreciated that the optical fiber interrogator 300 may be implemented in various other ways while still being configured to support distributed fiber optic sensing of a fiber optic cable based on interrogation of an optical fiber of the fiber optic cable that is, e.g., simultaneously carrying data communication wavelength channels using an interrogation wavelength channel where the data communication wavelength channels and the interrogation wavelength channel are spectrally separated.

Figure 4:
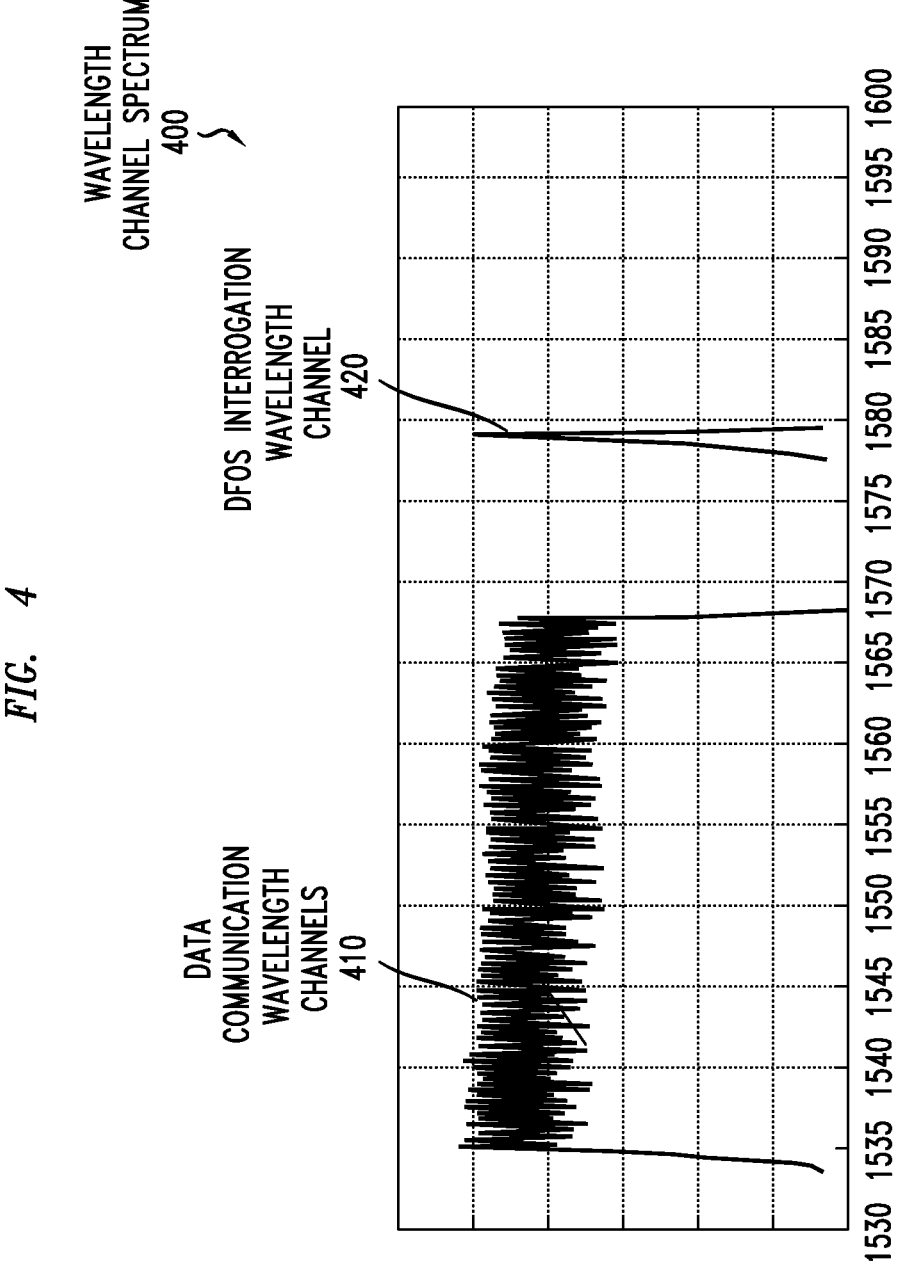
FIG. 4 depicts an example embodiment of a wavelength channel spectrum illustrating separation of the data communication wavelength channels and the interrogation wavelength channel used for distributed fiber optic sensing via fiber optic cables.

FIG. 4 depicts an example embodiment of a wavelength channel spectrum illustrating separation of the data communication wavelength channels and the interrogation wavelength channel used for distributed fiber optic sensing via fiber optic cables. As depicted in FIG. 4, the wavelength channel spectrum 400 includes a set of data communication wavelengths channels 410 and a DFOS interrogation wavelength channel 420 that is substantially spectrally separated from the data communication wavelength channels 410. The data communication wavelength channels 410 are provided in the C-band (illustratively, for example, between about 1535 nm and 1568 nm). The DFOS interrogation wavelength channel 420 is provided in the L-band and typically at a substantial spectral shift from the C-band (illustratively, for example, at about 1577 nm). In at least some example embodiments, the DFOS interrogation wavelength channel 420 may be provided near the low end of the L-band. In at least some example embodiments, the DFOS interrogation wavelength channel 420 may be provided using ITU L00 equal to 190000 GHz/1577.86 nm. It will be appreciated that the wavelength channel spectrum 400 is configured to support improved sensing for fiber optic cables by providing significant wavelength separation between the data communication wavelength channels 410 and the DFOS interrogation wavelength channel 420, low optical transmission loss at the DFOS interrogation wavelength channel 420, and premium system performance for DFOS since low noise lasers are available at the DFOS interrogation wavelength channel 420. In particular, the spectral separation of the data communication wavelength channels and the interrogation wavelength channel is typically sufficient to greatly reduce optical crosstalk on the interrogation wavelength channel and also to significantly reduce the amount of ASE noise, i.e., due to optical amplifier(s) for the data communication wavelength channels, thereon so that the weak backscattered light of the interrogation wavelength channel is less mixed with undesired optical noise.

Figure 5:
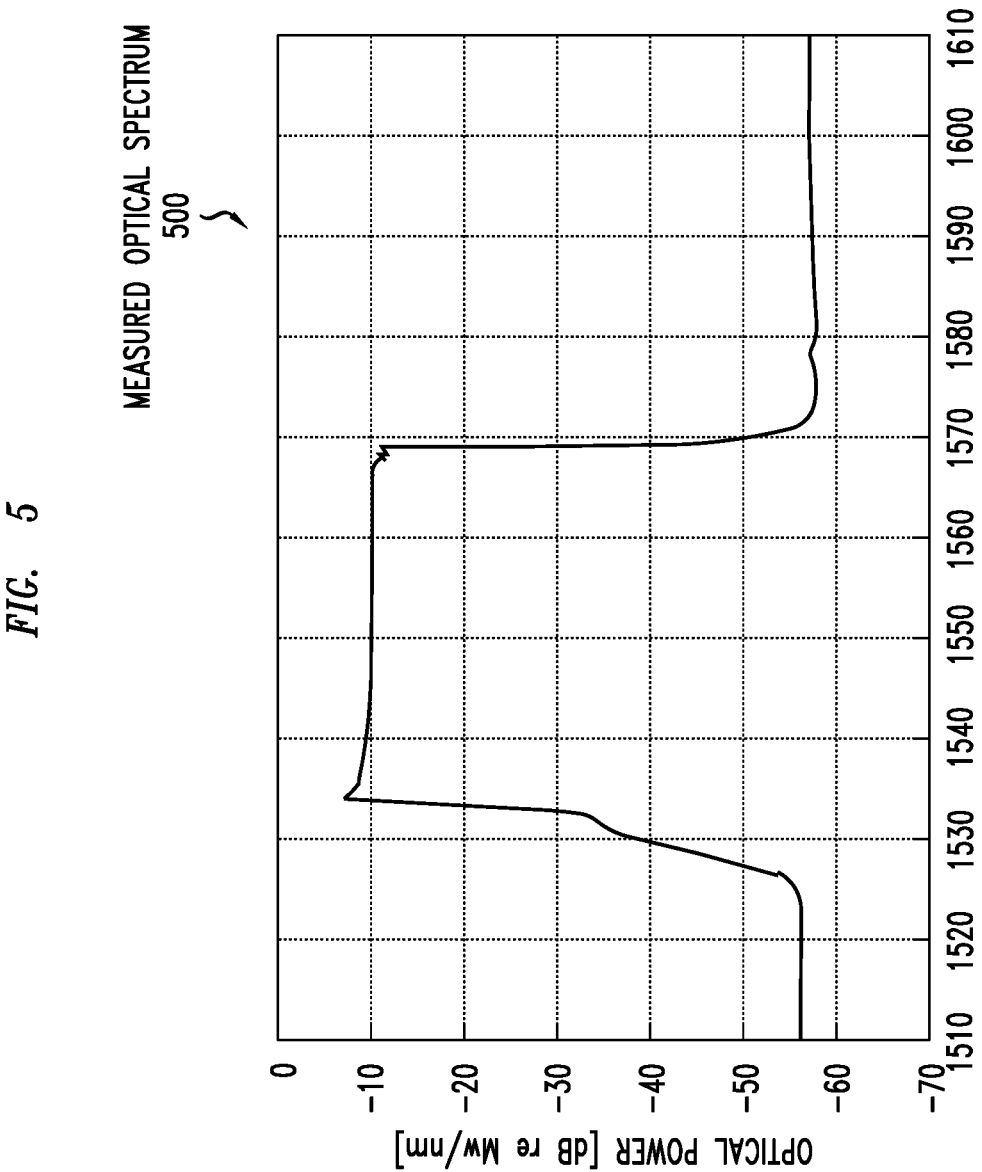
FIG. 5 depicts an example embodiment of the measured optical spectrum at the output of a full-length repeatered optical fiber link for the data wavelength channel spectrum of FIG. 4.

FIG. 5 depicts an example embodiment of the measured optical spectrum at the output of a full-length repeatered optical fiber link for the data wavelength channel spectrum of FIG. 4. As depicted in FIG. 5, the measured optical spectrum 500 has an optical power density of approximately −10 dB re mW/nm between wavelengths of about 1530 nm and about 1570 nm. The measured optical spectrum 500 illustrates that the ASE is very low for wavelengths greater than 2 nm outside of the optical transmission bandwidth (which corresponds to the data communication wavelength channels 410 in the wavelength channel spectrum 400 of FIG. 4) and, thus, the level of ASE reflected back to the DFOS interrogator through the WDM component is expected to be negligible. This eliminates the risk of DFOS data quality degradation introduced by ASE noise.

FIG. 6 depicts an example embodiment of a method for use by an optical fiber interrogator for supporting distributed fiber optic sensing via a fiber optic cable based on interrogation of an optical fiber carrying data communication wavelength channels using an interrogation wavelength channel where the data communication wavelength channels and the interrogation wavelength channel are spectrally separated. It will be appreciated that, although primarily presented as being performed serially, at least a portion of the functions of method 600 may be performed contemporaneously or in a different order than as presented with respect to FIG. 6. At block 601, method 600 begins. At block 610, receive optical data communication signals from a near end of an optical fiber line on a first wavelength band. At block 620, provide, by an optical fiber interrogator, an optical probe signal in a second wavelength band to the near end of the optical fiber line for interrogating the optical fiber line, wherein the first wavelength band and the second wavelength band are spectrally separated. At block 630, detect, by the optical fiber interrogator, a portion of the optical probe signal backscattered in the optical fiber line. At block 699, the method 600 ends.

It will be appreciated that, although primarily presented with respect to example embodiments in which the receive optical fiber is interrogated, in at least some example embodiments the transmit optical fiber also or alternatively may be interrogated based on use of an optical interrogation signal operating in a wavelength band that is outside of the wavelength band of the optical data communication signals.

Various example embodiments for supporting distributed sensing via fiber optic cables based on spectral separation of the optical data communication channels and the optical interrogation channel may provide various advantages or potential advantages.

For example, various example embodiments for supporting distributed sensing via fiber optic cables based on spectral separation of the optical data communication channels and the optical interrogation channel may support distributed sensing for fiber optic cables without any loss of revenue for the fiber optic cable operators since there is no need to reserve optical data communication channels (which may otherwise be used for transporting customer data and, thus, which result in revenue generation for the cable operators) for distributed sensing via fiber optic cables.

For example, various example embodiments for supporting distributed sensing via fiber optic cables based on spectral separation of the optical data communication channels and the optical interrogation channel may support distributed sensing for fiber optic cables without a need for dark fibers, thereby obviating the need to try to introduce additional fibers within fiber optic cables (which may be expensive or even physically impossible given the lack of physical space within the fiber optic cables to accommodate additional optical fiber pairs) and increasing the number of optical fibers within the fiber optic cables that may be used for optical data communication channels.

For example, various example embodiments for supporting distributed sensing via fiber optic cables based on spectral separation of the optical data communication channels and the optical interrogation channel, when monitoring is based on DAS, may support distributed sensing for fiber optic cables with reduced risk of cross-coupling from the DAS optical interrogation channel to the optical data communication channels, due to the relatively large separation between the DAS interrogation wavelength of the DAS optical interrogation channel and the communication wavelengths of the optical data communication channels.

For example, various example embodiments for supporting distributed sensing via fiber optic cables based on spectral separation of the optical data communication channels and the optical interrogation channel, when monitoring is based on DAS, may support distributed sensing for fiber optic cables without degradation of DAS data quality since ASE noise is eliminated and DAS can still operate at a wavelength where optical components for high-performance DAS are available (e.g., when operating DAS by WDM on an amplified telecom fiber the DAS may be multiplexed to the receive optical fiber so as not to disturb amplification of the transmission channels through the repeaters), thereby ensuring relatively high DAS sensitivity for improved sensing via fiber optic cables.

For example, various example embodiments for supporting distributed sensing via fiber optic cables based on spectral separation of the optical data communication channels and the optical interrogation channel may support monitoring of various types of fiber optic cables using various DFOS techniques in a manner supporting various types of sensing for fiber optic cables, such as sensing for identifying various conditions which may negatively impact the fiber optic cables and the associated optical data communication signals propagating via optical fibers therein (e.g., natural phenomena, human activity, conditions internal to the fiber optic cables, conditions associated with the fiber optic cable structure itself, external aggression, and so forth), sensing for opportunistic purposes (e.g., monitoring marine life, monitoring of vessel traffic, monitoring environmental conditions, monitoring seismic activity, performing seismic imaging, monitoring of subsea infrastructure like pipelines, power cables, pumps or compressors, and so forth), or the like, as well as various combinations thereof.

It will be appreciated that various example embodiments for supporting distributed sensing via fiber optic cables based on spectral separation of the optical data communication channels and the optical interrogation channel may provide various other advantages or potential advantages.

Figure 7:
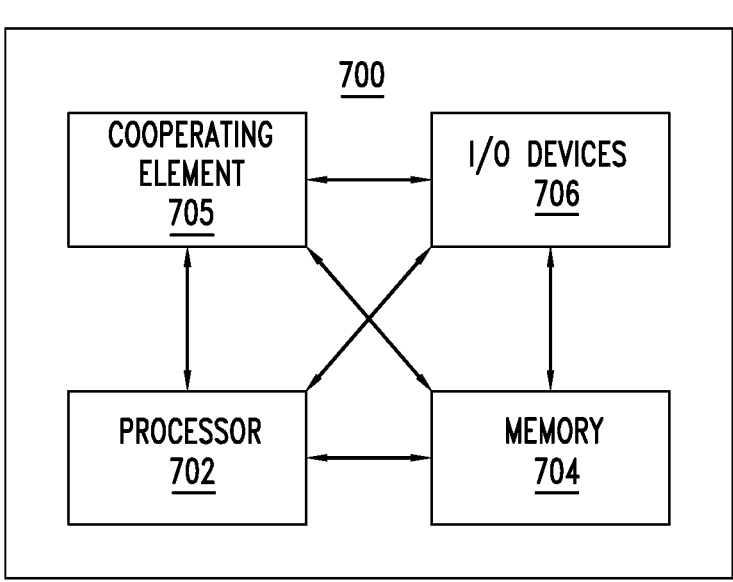
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory, a read only memory, or the like). The processor 702 and the memory 704 may be communicatively connected. In at least some example embodiments, the computer 700 may include at least one processor and at least one memory including computer program code, wherein the at least one memory and the computer program code are configured, with the at least one processor, to cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements presented herein, combinations of functional elements presented herein, or the like, as well as various combinations thereof. For example, computer 700 may provide a general architecture and functionality that is suitable for implementing one or more devices presented herein, such as an element of central office 110 or a portion thereof, an SLTE 120 or a portion thereof, a DFOS interrogator 140 or a portion thereof, an SLTE 210 or a portion thereof, a DFOS interrogator 230 or a portion thereof, an optical fiber interrogator 300 or a portion thereof, an optical transmitter 310 or a portion thereof, an optical receiver 350 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer program code, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
an optical data transceiver having a first optical port for transmitting optical data communication signals to a near end of a first optical fiber line and a different second optical port for receiving optical data communication signals from a near end of a different second optical fiber line; and
a distributed fiber optic sensing interrogator configured to transmit a distributed fiber optic sensing probe signal to the second optical fiber line via the second optical port and to detect a portion of the distributed fiber optic sensing probe signal backscattered in the second optical fiber line, wherein the distributed fiber optic sensing interrogator is configured to perform, based on the detected portion of the distributed fiber optic sensing probe signal backscattered in the second optical fiber line, distributed fiber optic sensing; and
wherein the optical data communication signals are in a first wavelength band and the distributed fiber optic sensing probe signal is in a second wavelength band spectrally separated from the first wavelength band;
wherein the first wavelength band is within a conventional optical telecommunication band (C-band) and the second wavelength band is within a long wavelength optical telecommunication band (L-band), and wherein the second wavelength band is at least 2 nm outside of the first wavelength band.

2. The apparatus of claim 1, wherein the distributed fiber optic sensing interrogator is connected to receive the backscattered portion from the second optical port.

3. The apparatus of claim 1, wherein the C-band includes wavelengths in a range between about 1535 nm and about 1568 nm and L-band includes wavelengths in a range between about 1565 nm and about 1625 nm.

4. The apparatus of claim 1, wherein the first wavelength band includes wavelengths in a range between about 1535 nm and about 1568 nm.

5. The apparatus of claim 1, wherein the distributed fiber optic sensing interrogator is configured to perform, based on the detected portion of the distributed fiber optic sensing probe signal backscattered in the second optical fiber line, at least one of determining locations of sensed events along the second optical fiber line, determining times of sensed events along the second optical fiber line, or recording signals of sensed events along the second optical fiber line.

6. The apparatus of claim 1, further comprising:
an optical wavelength multiplexer configured to direct the optical data communication signals from the second optical fiber line to the optical data transceiver and to direct the distributed fiber optic sensing probe signal to the second optical fiber line.

7. The apparatus of claim 1, further comprising:
an optical wavelength multiplexer configured to direct the optical data communication signals from the second optical fiber line to the optical data transceiver and to direct the portion of the distributed fiber optic sensing probe signal backscattered in the second optical fiber line to the distributed fiber optic sensing interrogator.

8. The apparatus of claim 1, wherein the distributed fiber optic sensing interrogator includes:
an optical transmitter configured to provide the distributed fiber optic sensing probe signal for interrogating the second optical fiber line; and
an optical receiver configured to detect the portion of the distributed fiber optic sensing probe signal backscattered in the second optical fiber line.

9. A method, comprising:
receiving optical data communications from a near end of an optical fiber line on a first wavelength band;
providing, by a distributed fiber optic sensing interrogator, a distributed fiber optic sensing probe signal in a second wavelength band to the near end of the optical fiber line for interrogating the optical fiber line, wherein the first wavelength band and the second wavelength band are spectrally separated; and
detecting, by the distributed fiber optic sensing interrogator, a portion of the distributed fiber optic sensing probe signal backscattered in the optical fiber line;
wherein the first wavelength band is within a conventional optical telecommunication band (C-band) and the second wavelength band is within a long wavelength optical telecommunication band (L-band), and wherein the second wavelength band is at least 2 nm outside of the first wavelength band.

10. The method of claim 9, wherein the distributed fiber optic sensing interrogator is connected to receive the backscattered portion from the same near end.

11. The method of claim 9, further comprising:
performing, based on the detected portion of the distributed fiber optic sensing probe signal backscattered in the optical fiber line, at least one of determining locations of sensed events along the optical fiber line, determining times of sensed events along the optical fiber line, or recording signals of sensed events along the optical fiber line.

12. The method of claim 9, wherein the C-band includes wavelengths in a range between about 1535 nm and about 1568 nm and L-band includes wavelengths in a range between about 1565 nm and about 1625 nm.

13. The method of claim 9, wherein the first wavelength band includes wavelengths in a range between about 1535 nm and about 1568 nm.

14. The method of claim 9, further comprising:
directing, by an optical wavelength multiplexer, the optical data communication signals from the optical fiber line to an optical data transceiver; and
directing, by the optical wavelength multiplexer, the distributed fiber optic sensing probe signal to the optical fiber line.

15. The method of claim 9, further comprising:

directing, by an optical wavelength multiplexer, the optical data communication signals from the optical fiber line to an optical data transceiver; and directing, by the optical wavelength multiplexer, the portion of the distributed fiber optic sensing probe signal backscattered in the optical fiber line to the distributed fiber optic sensing interrogator.

16. The method of claim 9, further comprising:

providing, by an optical transmitter, the distributed fiber optic sensing probe signal for interrogating the optical fiber line; and detecting, by an optical receiver, the portion of the distributed fiber optic sensing probe signal backscattered in the optical fiber line.

* * * * *